United States Patent [19]

Gerhart et al.

[11] Patent Number: 4,847,401

[45] Date of Patent: Jul. 11, 1989

[54] CONTINUOUS LARGE-SCALE PRODUCTION OF ETHYL 2,2-DIFLUORO-4-PENTENOATE AND 2-FLUORINATED METHYL AMINOACETONITRILES BY USE OF A FLOW REACTOR

[75] Inventors: Fritz Gerhart, Leutesheim; Michael Kolb, Truchtersheim, both of Fed. Rep. of Germany

[73] Assignee: Merrell Dow Pharmaceuticals Inc., Cincinnati, Ohio

[21] Appl. No.: 145,694

[22] Filed: Jan. 15, 1988

Related U.S. Application Data

[60] Continuation of Ser. No. 935,069, Nov. 21, 1986, abandoned, which is a division of Ser. No. 815,345, Dec. 31, 1985, abandoned.

[51] Int. Cl.$^4$ ............... C07C 120/00; C07C 121/42; C07C 69/63; C07C 69/65
[52] U.S. Cl. ................................. 558/378; 422/119; 422/203; 422/205; 422/208; 422/226; 558/452; 560/219
[58] Field of Search ............... 560/219; 558/378, 452

[56] References Cited

U.S. PATENT DOCUMENTS

| | | | |
|---|---|---|---|
| 1,835,827 | 12/1931 | Varnes | 422/208 |
| 2,667,348 | 12/1953 | Bonilla | 422/208 |
| 3,028,227 | 4/1962 | Ballestra | 422/226 X |
| 3,313,838 | 4/1967 | Rozzi | 422/205 X |
| 3,622,281 | 11/1971 | Milligan et al. | 422/208 X |
| 3,635,682 | 1/1972 | Vine et al. | 422/203 X |
| 3,663,179 | 5/1972 | Mehta et al. | 422/208 X |
| 4,585,622 | 4/1986 | Bowe et al. | 422/205 X |

FOREIGN PATENT DOCUMENTS 2083031 3/1982 United Kingdom .

*Primary Examiner*—Joseph Paul Brust
*Attorney, Agent, or Firm*—Stephen L. Nesbitt

[57] ABSTRACT

The large scale preparation of ethyl 2,2-difluoro-4-pentenoate and 2-fluorinated methyl aminoacetonitriles by reaction of 2-H-perfluoroethyl allyl ether and n-butyl lithium and fluoromethylacetonitrile and a Grignard reagent, respectively, is largly unsuccessful because of side reactions which convert intermediate products and reactants to undesired products. Applicants have overcome these problems by performing the reactions with cooling in a continuous manner in a flow reactor with short residence time.

3 Claims, 5 Drawing Sheets

CONTINUOUS LARGE-SCALE PRODUCTION OF ETHYL 2,2-DIFLUORO-4-PENTENOATE AND 2-FLUORINATED METHYL AMINOACETONITRILES BY USE OF A FLOW REACTOR

This is a continuation of application Ser. No. 935,069, filed Nov. 21, 1986, now abandoned, which is a divisional of application Ser. No. 815,345, filed Dec. 31, 1985, now abandoned.

The present invention relates to the carrying out of chemical reactions in a continuous manner utilizing short residence times and low temperatures. In particular, the invention provides a flow-reactor system for said reactions.

It is known that 2-H-perfluoroethyl allyl ether can be dehydrofluorinated by reaction with n-butyl lithium at low temperature and that the resultant 1,2,2-trifluorovinyl allyl ether undergoes a Claisen rearrangement to form 2,2-difluoro-4-pentenoyl fluoride (see J. F. Normant et al, Bull. Soc. Chim. France, 1974, 2072). The acid fluoride can then be treated with a nucleophile, especially water or an alcohol, to yield 2,2-difluoro-4-pentenoic acid or a derivative thereof.

The reactions proceed satisfactorily on a laboratory scale but attempts to scale up the reactions have been unsuccessful. The rate of the Claisen rearrangement is significant even at temperatures below −70° C., and, with increasing reaction time, the butyl lithium reacts with the acid fluoride to produce the corresponding tertiary alcohol. Said reaction not only depletes the butyl lithium available for the dehydrofluorination but also depletes the acid fluoride available for subsequent reaction with the nucleophile.

This problem could be overcome by conducting the dehydrofluorination reaction in a continuous manner utilizing a sufficiently short residence time. However, we are not aware of any flow-reaction system suitable for providing the very short residence time, preferably less than 1 minute, and low temperatures, preferably about −50° C. or lower, required to reduce the butyl lithium/acid fluoride reaction on scale up of the dehydrofluorination.

There are many other reactions in which it is desirable to provide a short residence time at low temperature. For example, the preparation of a fluorinated methyl ketimine magnesium halide by treating a Grignard reagent with fluoroacetonitrile usually is conducted at a temperature of −30° C. to −40° C. Unfortunately, the ketimine salt further slowly cyclizes to form the corresponding 2-substituted 2H-azirine which subsequently reacts with the Grignard reagent to form inter alia 2,2-disubstituted aziridine. In both of these undesired by-products, the 2-substituent group(s) is the organo group of the Grignard reagent. The desired ketimine salt is of particular use for reaction with hydrogen cyanide, or aqueous ammonium cyanide, or an aqueous solution of an alkali metal cyanide and a proton source to yield the corresponding 2-fluorinated methyl aminoacetonitrile (see U.K. Pat. No. 2083031).

The inventors have now devised a flow-reactor system of relatively simple construction which permits a chemical reaction to be carried out continuously utilizing a short residence time and low temperature. The system comprises a closed tubular flow reactor having at least two inlet ports and an outlet port. Respective fluid supply conduits communicate with the inlet ports and a fluid outlet conduit communicates with the outlet port. At least one of the fluid supply conduits is thermally conducting and is coiled proximate to the tubular flow reactor so that, when said flow reactor is located in a cooling zone, fluid passing through said conduit(s) is in heat exchange with the cooling zone. Pump means are provided to control the flow of fluid through the reactor and thereby provide the required residence time.

According to the present invention, there is provided a flow-reactor system comprising:
  a closed tubular flow reactor comprising at least two inlet ports and an outlet port;
  respective fluid supply conduits communicating with said inlet ports;
  at least one of said fluid supply conduits being thermally conductive and coiled proximate to said flow reactor;
  a fluid outlet conduit communicating with said outlet port; and
  pump means for controlling the flow of fluid through said flow reactor.

Preferably, the flow reactor has a right circular reaction chamber and, suitably is formed by a tubular main body having a circular recess closed by a cover plate. Usually said flow reactor will be constructed of a heat-conducting material, such as metal, for example brass, or stainless steel so as to permit heat exchange between the content of the reaction chamber and the surroundings of said flow reactor.

The number of inlet ports in the flow reactor will be determined by the number of fluid streams to be introduced into the reactor. Usually, there will be only two inlet ports. Suitably, the inlet ports are angularly spaced apart in the circumferential wall of the flow reactor. Preferably, the ports are equiangularly spaced apart. Thus, when there are only two inlet ports, they are diametrically opposed. It also is preferred that the inlet ports are located at one end of the flow reactor.

Usually, only one outlet port is provided, although there may be two or more outlet ports, if required. Preferably, the outlet port is located at the end of the reactor furthest from the inlet ports.

The reactor may be provided with temperature sensing means to measure the temperature within the reactor. Suitably, said means can be provided by a thermocouple.

It is preferred that stirring means are provided within the flow reactor and, suitably, a mechanically or magnetically driven stirrer can be employed.

Respective fluid supply conduits communicate with the inlet ports and hence there will as many fluid supply conduits as there are inlet ports. When there are more than two inlet ports, some of the ports may be supplied from a common source. At least one, and preferably all of the fluid supply conduits are thermally conductive and coiled proximate to the reactor. Usually, the coiled part of the fluid supply conduit will be coiled around but spaced apart from the flow reactor to facilitate heat exchange with its surroundings. Suitably, the fluid supply conduits are formed of metal, eg. brass or stainless steel.

The outlet port or ports communicate with a respective fluid outlet conduit to discharge the reaction mixture from the flow reactor. Usually, it will be unnecessary for the fluid outlet conduit to be thermally conductive and polytetrafluoroethylene (PTFE) tubing suitably can be employed.

The reactor and proximate coiled part(s) of the fluid supply conduit(s) usually will be located in a cooling zone. This zone can be provided by an open or closed vessel within which the flow reactor is located. The cooling medium employed in the vessel can be chosen having regard to the temperature to be maintained within the reaction chamber. It conveniently can be, for example, methanol/dry ice, acetone/dry ice, liquid nitrogen, or methanol/liquid nitrogen. Electric devices such as kryostats also may be used.

Frequently, the outlet conduit will deliver the reaction mixture to a further reaction zone for subsequent treatment. Thus, in the case of the dehydrofluorination of 2-H-perfluoroethyl allyl ether, the outlet conduit can debouch into a cold stirred solution of triethylamine in absolute ethanol to yield ethyl 2,2-difluoro-4-pentenoate. In the case of the reaction of a Grignard reagent with fluoroacetonitrile, the fluid outlet conduit can be connected to an inlet port of a further flow reactor system of the invention supplied with, for example, an aqueous solution of sodium cyanide and ammonium chloride.

The flow of fluid through the reactor can be controlled by a single pump drawing reaction product from the flow reactor. However, the pump means usually comprises respective pumps for pumping fluid through each of the fluid supply conduits. Suitably, said pumps are metering pumps, for example those available from Fluid Metering Inc (Oyster Bay, N.Y. 11771, U.S.A.) under the Trade Mark FMI LAB PUMP, or membrane dosing pumps, for example those available from Chemie and Filter GmbH (Heidelberg, Germany) under the Trade Mark PROMINENT.

The following is a description, by way of example with reference to the accompanying drawings, of presently preferred embodiments of the invention and is not intended to limit the invention in any way. In the drawings.

Figure 1:
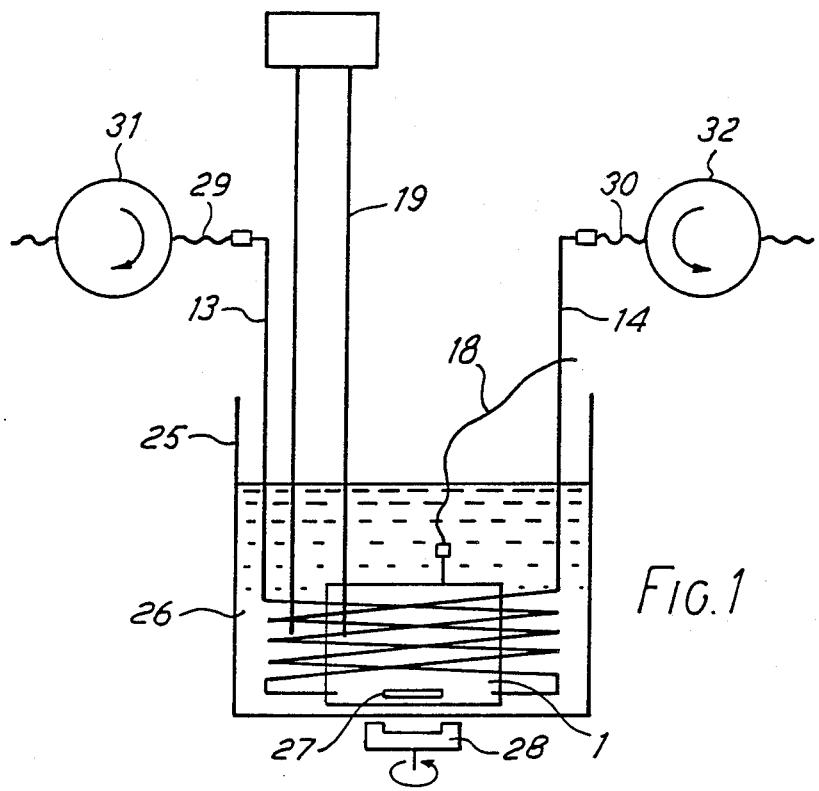
FIG. 1 is a diagrammatic representation of a flow reactor system in accordance with the most preferred embodiment of the present invention.

Referring to FIGS. 1 to 5 of the drawings, the flow reactor system comprises a closed tubular flow reactor 1 formed of brass or stainless steel and having a tubular main body 2 and a circular closure plate 3. The main body 2 has a right cylindrical portion 4 closed at its lower end by an integral end wall to define a reaction chamber 5. A cylindrical flange 6 extends radially outwardly from the upper end of the cylinder and has six equiangularly spaced threaded bores 7. The closure plate 3 is circular and of equal diameter to the flange. Bolts 8 extend through plain bores 9 in the flange to be threadably received in the bores 7 to secure the closure plate to the main body. A PTFE (polytetrafluoroethylene) sealing ring 10 is located in a circular groove in the upper surface of the flange 6 to provide a fluid tight seal between the closure plate 3 and the flange 6.

Suitably, the circumferential and end walls of the main body and the cover plate are of about 5 mm thickness and the reaction chamber has an axial length of 40 mm and a diameter of 40 mm to provide a capacity of approximately 50 ml.

Two inlet ports 12 communicating with the reaction chamber 5 are provided at diametrically opposed locations in the base of the cylindrical body portion 4. Respective brass fluid supply conduits 13, 14 are connected to the inlet ports by respective commercial brass 6 mm ferrules 15. PTFE sealing rings 16 are provided to ensure a fluid tight seal between the ferrules and the body portion 4. The fluid supply conduits 13,14 are each coiled around the flow reactor 1 and then extend upwardly to terminate in connection nipples 22.

An outlet port 17 is provided in the closure plate 3 and a PTFE outlet conduit 18 is connected thereto by a third ferrule 15 with a PTFE sealing ring 16 providing a fluid tight seal between said ferrule 15 and the closure plate 3. When the reaction chamber has a capacity of approximately 50 ml, the fluid supply and fluid outlet conduits 13,14,18 suitably have a diameter of 6 mm.

A second smaller port 17' is provided in the closure plate 3 to permit location of a thermocouple 19 in the reaction chamber 5. The thermocouple is secured in port 17' by a commercial stainless steel ferrule 20 and a PTFE sealing ring 21 forms a fluid tight seal between the ferrule 20 and the closure plate 3.

The flow reactor is supported by a pair of arms 23 depending from a cross-member 24. The cross-member 24 is fixed above the upper edge of an open cylindrical vessel 25 containing a cooling medium 26 in which the flow reactor 1 and the coiled portions of the fluid supply conduits 13,14 are totally immersed.

A stirrer 27 is provided within the reaction chamber 5 and is driven by an external magnet 28.

Respective PTFE tubes 29, 30 extend from the outlets of respective pumps 31, 32 to the connection nipples 22 of the fluid supply conduits 13,14 to deliver their respective reactants via said conduits to the reaction chamber 5. The pumps are variable speed metering pumps (FMI LAB PUMPS) or membrane pumps (PROMINENT) and, in use, are adjusted to supply the reactants to the reaction chamber in the required relative proportions and at the required rates. Usually, the speed of the pumps will be chosen to provide a residence time of less than 1 minute in the reaction chamber.

Figure 6:
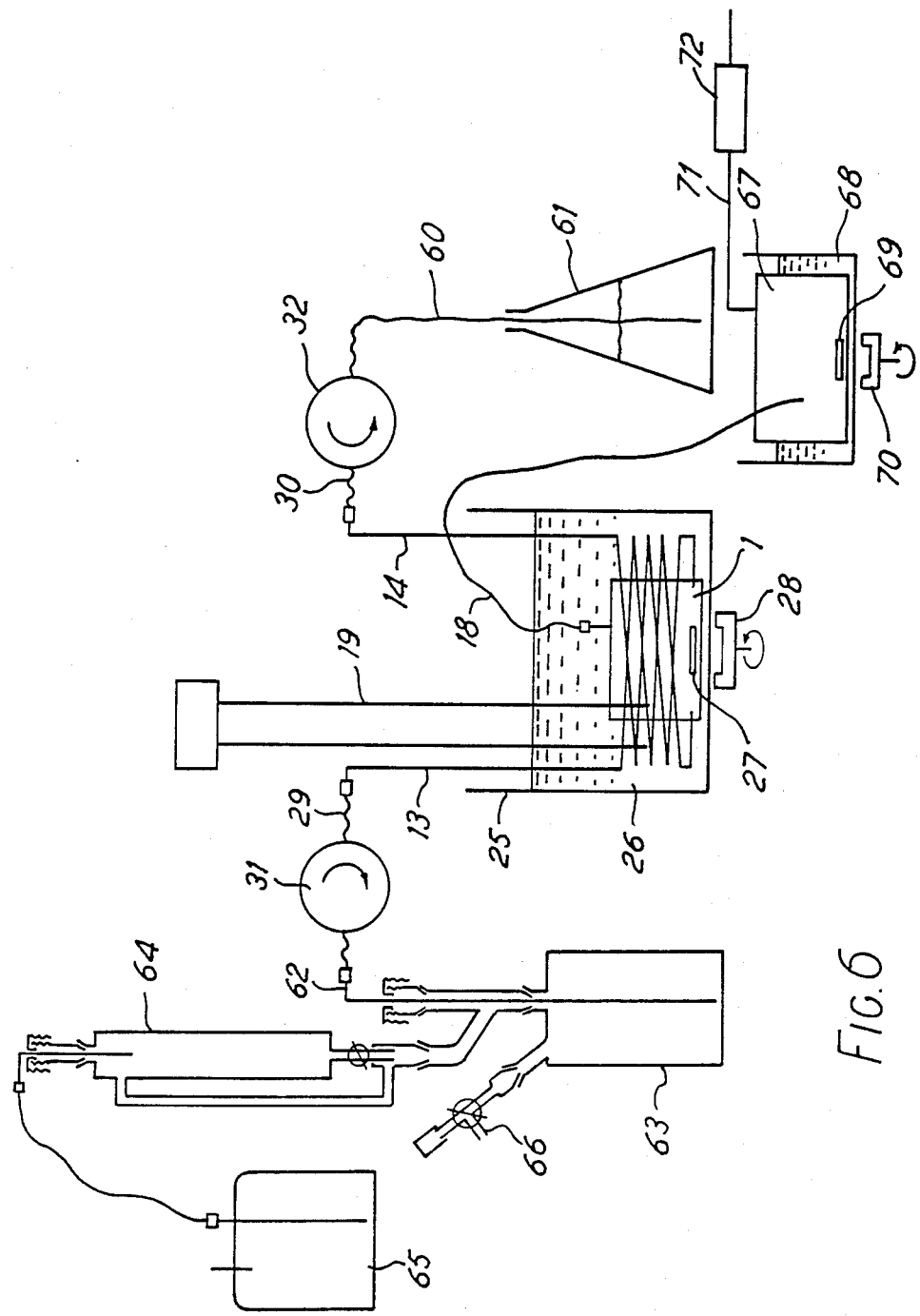
FIG. 6 is a diagrammatic view of apparatus, incorporating the flow reactor system of FIG. 1, for use in the preparation of ethyl 2,2-difluoro-4-pentenoate.

Referring now to FIG. 6, the flow reactor system of FIG. 1 is incorporated in apparatus for the production of ethyl 2,2-difluoro-4-pentenoate. The pump 32 is connected by PTFE tubing 60 to a vessel 61 containing a solution 2-H-perfluoroethyl allyl ether in THF (tetrahydrofuran).

The pump 31 is connected by PTFE tubing 62 to a flask 63 containing a solution of n-butyl lithium in hexane. This solution is supplied from a graduated funnel 64 which in turn is filled from a supply tank 65 by nitrogen pressure. Nitrogen can be admitted to the flask 63 via line 66 to maintain a nitrogen atmosphere within the flask.

The outlet conduit 18 debouches into a vessel 67 containing a solution of triethylamine in absolute ethanol. The vessel is located in an ice bath 68 and equipped with a stirrer 69 driven by an external magnet 70. The outlet 71 is protected from moisture by a tube 72 containing calcium chloride.

An example of the operation of the apparatus of FIG. 6 is given in Example 1 hereinafter.

Figure 2:
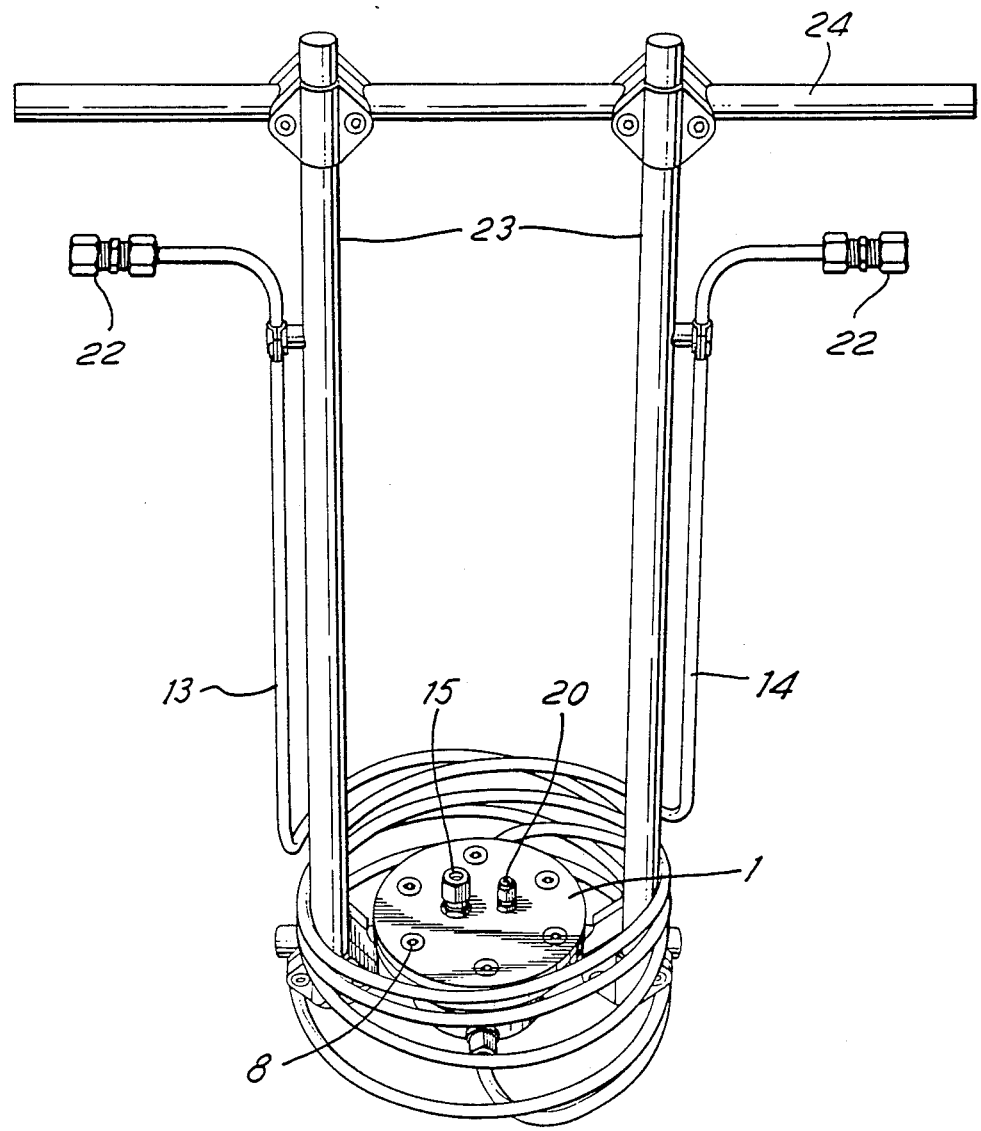
FIG. 2 is a perspective view of the flow reactor and fluid supply conduits of the system of FIG. 1.
Figure 7:
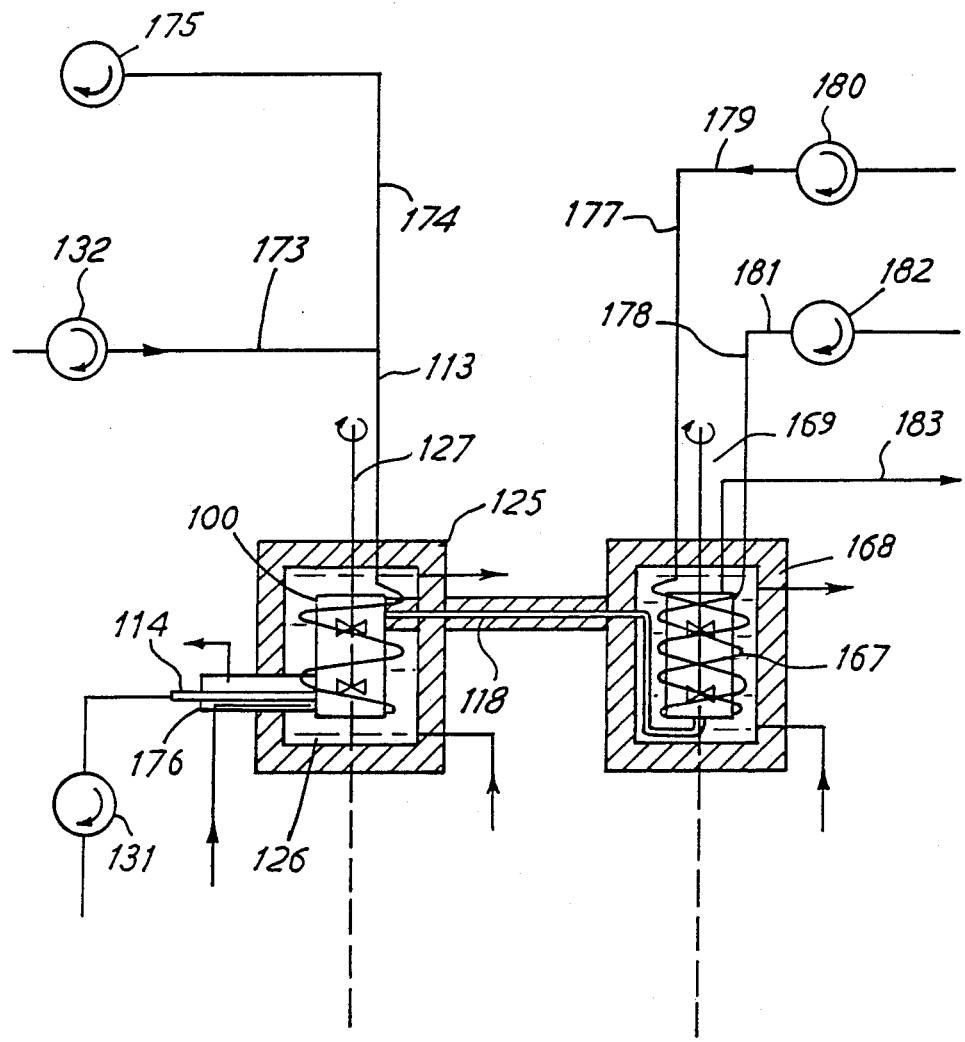
FIG. 7 is a diagrammatic representation of apparatus, incorporating a modified flow reactor system of FIG. 1, for use in the preparation of a 2-difluorinated methyl aminoacetonitrile.

In the embodiment of FIG. 7, the flow reactor 100 is of similar construction to the flow reactor 1 but the outlet port (17, FIG. 2) is provided at the upper end of the cylindrical body portion (4, FIG. 2) instead of in the closure plate (3, FIG. 2). The outlet conduit 118 connects said outlet port to an inlet port in the bottom wall of a second flow reactor 167. The second flow reactor also is of similar construction to the flow reactor 1 but is made of stainless steel and has said additional inlet port in its bottom wall. Both of reactors 100 and 167 are fitted with respective mechanical stirrers 127 and 169 respectively.

Flow reactor 100 is enclosed in a cooling bath 125 through which methanol 126 is circulated. The methanol is maintained at −30° to −35° C. by an external kryostate (not shown). Flow reactor 167 is enclosed in a bath 168 through which brine at 0° C. is circulated. Typically reactor 100 is of 50 ml capacity and reactor 167 is of 250 ml capacity.

A copper tube 113 is connected to one of the inlet ports in flow reactor 100 and is coiled around but spaced from the reactor in the same manner as tube 13 of FIG. 2. This tube 113 is connected by further copper tubes 173, 174 to pumps 132, 175 respectively. Pump 132 is supplied with fluoroacetonitrile from a source thereof (not shown) and pump 175 is supplied with tetrahydrofuran from a source thereof (also not shown).

Figure 3:
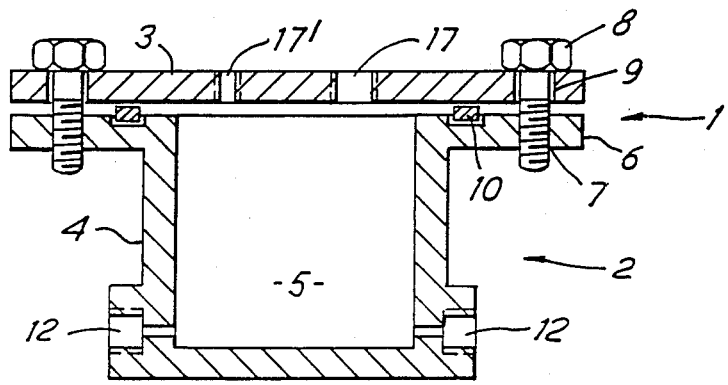
FIG. 3 is a cross-section of the flow reactor of FIG. 2.
Figure 4:
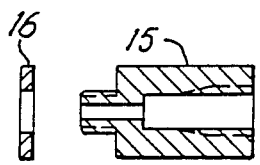
FIG. 4 is an exploded cross-sectional view of a ferrule and sealing ring used to connect the fluid supply conduits and outlet conduit to the respective ports of the flow reactor of FIG. 3.
Figure 5:
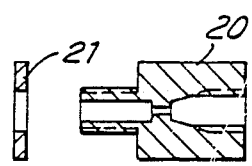
FIG. 5 is an exploded sectional view of the ferrule and sealing ring used to locate the thermocouple to the thermocouple port of the flow reactor of FIG. 3.

A PTFE tube 114 extends from the second inlet port and, unlike tube 14 of FIG. 3, is not coiled around the flow reactor 100. The end of tube 114 adjacent the reactor 100 is surrounded by a heating sleeve 176 through which a liquid, for example methanol, can be circulated to prevent crystallization of fluid flowing through the tube 114 as it passes through the cooling medium 126.

The tube 114 is connected by a further PTFE tube to a pump 131 supplied with a solution of a Grignard reagent in THF from a source thereof (not shown).

Brass tubes 177, 178 are connected to the respective inlet ports of reactor 167 and are coiled around but spaced from the reactor in the same manner as tubes 13 and 14 of FIG. 2. Tube 177 is connected by a PTFE tube 179 to a pump 180 which is supplied with aqueous sodium cyanide from a source thereof (not shown). Similarly, tube 178 is connected by a PTFE tube 181 to a pump 182 which is supplied with aqueous ammonium chloride from a source thereof (not shown). The reaction product exits from the reactor 167 in a PTFE outlet tube 183.

Figure 8:
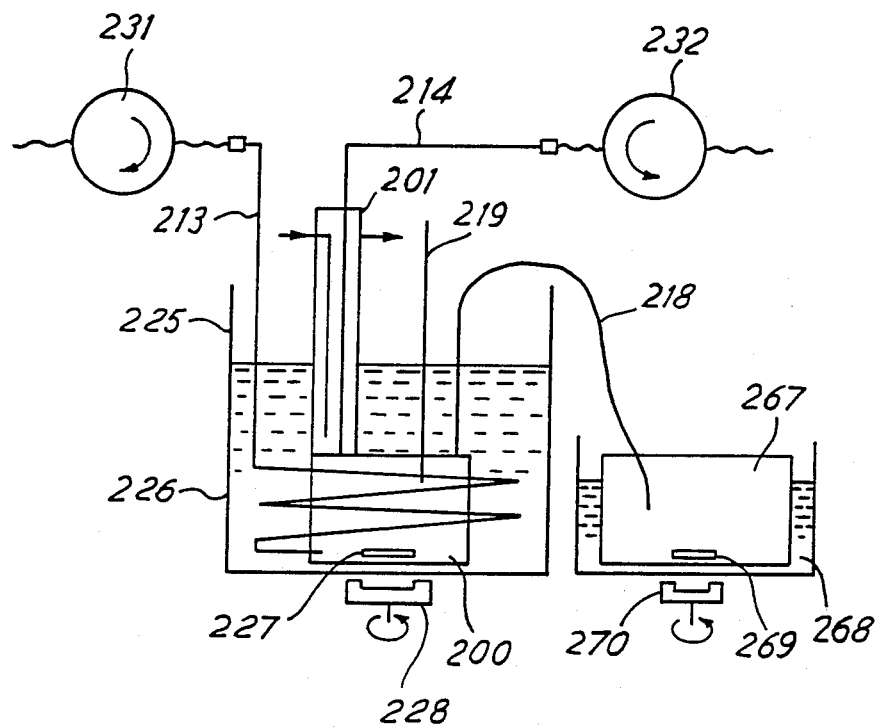
FIG. 8 is a diagrammatic representation of apparatus, incorporating another modified flow reactor system of FIG. 1, also for use in the preparation of a 2-difluorinated methyl aminoacetonitrile.

Referring now to FIG. 8, the flow reactor 200 is similar to the flow reactor 1 of FIGS. 1 to 6 but has the second inlet port (12, FIG. 2) provided in the closure plate (3, FIG. 2) instead of in the cylindrical portion (4, FIG. 2) of the reactor 200. The fluid supply conduit 214 connecting the second inlet port to the pump 232 is a PTFE tube and is not coiled around the reactor 200 but passes directly to the inlet port. The end of the tube 214 adjacent the reactor 200 is surrounded by a heating sleeve 201 through which a liquid, for example methanol, can be circulated to prevent crystallization of fluid flowing through the conduit as it passes through the cooling medium 226 in the cooling bath 225 in which the reactor 200 is located. Suitably, the cooling medium is maintained at, for example, −30° C. by circulation through a kryostat (not shown).

The tube 213 connecting the pump 231 to the inlet port in the cylindrical portion (4, FIG. 2) of the reactor 200 is formed of copper. The outlet conduit 218 connecting the reactor 200 to the vessel 267 is heat insulated.

A thermocouple 219 extends into the reactor 200 in similar manner to the thermocouple 19 of FIG. 6. Further, reactor 200 and vessel 267 are provided with externally magnetically driven stirrers 227/228 and 269/270 respectively.

The pump 231 is supplied with a solution of fluoroacetonitrile in THF from a source thereof (not shown) and pump 232 is supplied with a solution of a Grignard reagent in THF from a source thereof (also now shown). The vessel 267 contains an aqueous solution of sodium cyanide and ammonium cyanide and is cooled by an ice bath 268.

The operation of the apparatus of FIG. 8 is illustrated in Example 2 hereinafter.

It will be appreciated that the invention is not restricted to the constructional details particularly described above. In particular, numerous modifications and variations may be made to the particularly described construction without departing from the scope of the invention as defined in the claims.

The use of the flow reactor system of the invention is illustrated in the following non-limiting Examples.

EXAMPLE 1

Ethyl 2,2-difluoro-4-pentenoate

Using the apparatus of FIG. 6, a solution of 632.0 g (4.0 mol) of 2-H-perfluoroethyl allyl ether (Hoechst, West Germany) in 5 L of THF at a rate of 40 mL/min and a solution of n-butyl lithium in hexane (1.6M) at a rate of 20 mL/min are pumped into the reactor 1 cooled by dry-ice/acetone (−78° C.) to continuously form 1,2,2-trifluorovinyl allyl ether.

The start of the reaction in the reactor is indicated by a rise in temperature within the reaction chamber 5 from originally −74° C. to about −45° C. During the rest of the reaction period the temperature in the reaction chamber varies from about −45° C. to about −55° C. The reaction mixture from outlet conduit 18 containing the 1,2,2-trifluorovinyl allyl ether is conducted to a stirred solution of 434 g (600 mL, 4.3 mol) of triethylamine in 358 g (450 mL, 7.8 mol) of absolute ethanol cooled in an ice bath. Upon warming to the ice bath temperature, the 1,2,2-trifluorovinyl allyl ether spontaneously rearranges to 2,2-difluoro-4-pentenoyl fluoride, which in the presence of ethanol reacts to yield the desired ethyl 2,2-difluoro-4-pentenoate. The reaction mixture is divided into two equal batches which are treated separately. The following describes the workup of one batch.

The reaction mixture (about 4.1 L) is diluted with 1 L of pentane, and neutralized by careful addition of aqueous HCl (about 18%). The layers are separated, and the aqueous layer extracted twice more with pentane (1 L each). The combined organic layers (about 7 L) are washed with water (3 L), dried over MgSO$_4$, filtered and concentrated under reduced pressure (rotary evaporator, 100 mm Hg, 30° C.) to a volume of about 500 mL. Dropwise addition of this residue into a preheated flask (150° C. oil bath temperature) at 20 mm Hg results in the recovery of about 400 mL in a dry-ice cooled trap. Some hydroquinone is added, and the residue is fractionated to yield 156 g of pure ethyl 2,2-difluoro-4-pentenoate (bp 73° C./30 mm Hg, bath temperature 110° C.). From the forerun and the residue another 15 g of the ester is obtained by careful distillation to give a combined yield of 171 g.

$^1$H NMR (CDCl$_3$/TMS) delta 5.8 (m, 1H, CH=C), 5.37 (narrow m, 1.5H) and 5.20 ("d", 0.5H, —C=CH$_2$), 4.33 (q, 2H, J=7 Hz, O—CH$_2$), 2.85 (dt, 2H, J=16.5 and 6.6 Hz, CF$_2$—CH$_2$), 1.33 (t, 3H, J=7 Hz, CH$_3$).

$^{19}$F-NMR (CDCl$_3$, C$_6$F$_6$)+60.0 (t, J=16.5 Hz, CF$_2$).

EXAMPLE 2

The apparatus of FIG. 8 is purged with THF, the cooling medium 226 maintained at −28° C. by the kryostat and ice placed in the bath 268. The vessel 267 is filled with a solution of 52 g sodium cyanide and 154 g ammonium chloride in 870 mL water. Methanol at about 20° C. is circulated through the heating sleeve 201. Thereafter, the pump 232 is first started and after about 1 minute pump 231 also is started. Pump 232 is operated at a rate of 52 mL/min and pumps into the reactor 100 a 0.75M solution of propenylmagnesium bromide in THF. Pump 231 is operated at 18 mL/min and pumps into the reactor a solution of fluoroacetonitrile in THF (49 mL fluoroacetonitrile in 380 mL THF).

The temperature inside the reactor 200 increases and stabilizes at −3° to −4° C. and pump 231 is continued for about 17 minutes. Pump 231 is then connected to a source of THF and about 3 minutes later pump 232 also is connected to a source of THF. The system is then purged with THF for about 5 minutes.

The 2-fluoromethyl-2-amino-3-pentenonitrile formed in vessel 267 is worked up in conventional manner to provide a yield of 49.75 g (60.5% based on fluoroacetronitrile).

The molar ratios used were as follows:
Grignard, 39 mmoles/min; total 0.663 moles;
Fluoroacetonitrile, 37 mmoles/min; total 0.639 moles;
Sodium cyanide, 1.06 moles;
Ammonium chloride, 2.86 moles.

We claim:

1. A method for the production of ethyl 2,2-difluoro-4-pentenoate, wherein the improvement comprises the continuous preparation of 1,2,2-trifluorovinyl allyl ether via the dehydrofluorination of 2-H-perfluoroethyl allyl ether with n-butyl lithium at low temperatures and short residence times in a flow reactor system comprising, a closed tubular flow reactor comprising at least two inlet ports and an outlet port;

respective fluid supply conduits communicating with said inlet ports;

at least one of said fluid supply conduits being thermally conductive and coiled proximate to said flow reactor;

a fluid outlet communicating with said outlet port; and pump means for controlling the flow of fluid through said flow reactor;

and which comprises the spontaneous arrangement of said 1,2,2-trifluorovinyl allyl ether in the presence of ethanol to form said ethyl 2,2-difluoro-4-pentenoate.

2. A method for the production of 2-fluorinated methyl aminoacetronitriles, wherein the improvement comprises the continuous preparation of a fluorinated methyl ketimine magnesium halide via the reaction of a Grignard reagent with fluoroacetonitrile at low temperatures and short residence times in a flow reactor system comprising, a closed tubular flow reactor comprising at least two inlet ports and an outlet port;

respective fluid supply conduits communicating with said inlet ports;

at least one of said fluid supply conduits being thermally conductive and coiled proximate to said flow reactor;

a fluid outlet conduit communicating with said outlet port; and pump means for controlling the flow of fluid through said flow reactor;

which comprises the reaction of said ketimine magnesium halide salt with hydrogen cyanide, or aqueous ammonium cyanide, or an aqueous solution of an alkali metal cyanide and a proton source to form said 2-fluorinated methyl aminoacetronitrile.

3. A process for the preparation of 2-fluoro-methyl-2-amino-3-pentenonitrile according to claim 2, wherein the Grignard reagent is propenylmagnesium bromide.

* * * * *